US012625159B2

(12) United States Patent
Komizo

(10) Patent No.: US 12,625,159 B2
(45) Date of Patent: May 12, 2026

(54) PHYSICAL QUANTITY SENSOR AND INERTIAL MEASUREMENT UNIT

(71) Applicant: SEIKO EPSON CORPORATION, Tokyo (JP)

(72) Inventor: Koichiro Komizo, Suwa (JP)

(73) Assignee: SEIKO EPSON CORPORATION (JP)

( * ) Notice: Subject to any disclaimer, the term of this patent is extended or adjusted under 35 U.S.C. 154(b) by 359 days.

(21) Appl. No.: 18/171,512

(22) Filed: Feb. 20, 2023

(65) Prior Publication Data

US 2023/0266359 A1     Aug. 24, 2023

(30) Foreign Application Priority Data

Feb. 21, 2022     (JP) ................................. 2022-024692

(51) Int. Cl.
G01P 15/135        (2006.01)
G01P 15/125        (2006.01)
G01P 15/08          (2006.01)

(52) U.S. Cl.
CPC .......... G01P 15/135 (2013.01); G01P 15/125 (2013.01); *G01P 2015/0882* (2013.01)

(58) Field of Classification Search
CPC .............................................. G01P 2015/0828
See application file for complete search history.

(56) References Cited

U.S. PATENT DOCUMENTS

2002/0158293 A1     10/2002  Lee et al.
2006/0213268 A1      9/2006  Asami et al.

2007/0119252 A1     5/2007  Adams et al.
2011/0016972 A1 *   1/2011  Reinert .............. G01C 19/5783
                                                              73/514.16
2015/0053002 A1 *   2/2015  Ullrich .................. B81B 3/0045
                                                              73/514.15
2015/0301075 A1    10/2015  Yamanaka et al.
2016/0332864 A1    11/2016  Iihola et al.
2016/0332872 A1    11/2016  Iihola et al.
2017/0184626 A1 *   6/2017  Kameta ................. G01P 15/097
2018/0321275 A1    11/2018  Liukku et al.
2020/0408803 A1    12/2020  Konno et al.
(Continued)

FOREIGN PATENT DOCUMENTS

DE      102016210958 A1 *  12/2017
GB              2560192 A  *  9/2018  .............. G01P 1/003
(Continued)

*Primary Examiner* — Douglas X Rodriguez
*Assistant Examiner* — Ruben C Parco, Jr.
(74) *Attorney, Agent, or Firm* — Harness, Dickey & Pierce, P.L.C.

(57)          ABSTRACT

A physical quantity sensor includes an anchor fixed to a substrate, a support beam, a fixed electrode unit, a movable body, and a damper unit. The fixed electrode unit is provided at the substrate. One end of the support beam is coupled to the anchor. The movable body includes a movable electrode unit and a frame unit. The movable electrode unit includes a movable electrode facing a fixed electrode of the fixed electrode unit. The frame unit couples the movable electrode unit and the other end of the support beam. The damper unit is coupled to the frame unit, is provided in a region surrounded by the support beam and the frame unit, and damps vibration of the frame unit in a first direction.

8 Claims, 14 Drawing Sheets

(56)                    References Cited

U.S. PATENT DOCUMENTS

2021/0140995 A1* 5/2021 Reinke .................. G01P 15/125
2021/0171337 A1* 6/2021 Liukku ................... G01P 1/003

FOREIGN PATENT DOCUMENTS

| | | | |
|---|---|---|---|
| JP | 2003-014778 A | 1/2003 | |
| JP | 2006-266873 A | 10/2006 | |
| JP | 2009-500635 A | 1/2009 | |
| JP | 2018-515353 A | 6/2018 | |
| JP | 2019-023614 A | 2/2019 | |
| JP | 2021-004875 A | 1/2021 | |
| JP | 2021-524035 A | 9/2021 | |
| WO | WO-2018089733 A1 * | 5/2018 | ........... B81B 3/0051 |

* cited by examiner

FIG. 3

| | INITIAL STATE | | DIRECTION OF ACCELERATION | | | |
|---|---|---|---|---|---|---|
| | | | ⬆ DR3 | | ⬇ DR4 | |
| | ZA (N SIDE) | ZB (P SIDE) | ZA (N SIDE) | ZB (P SIDE) | ZA (N SIDE) | ZB (P SIDE) |
| OPERATION | 11 / 21 | 22 / 12 | 11 / 21 CAPACITANCE DECREASE | 22 / 12 | 11 / 21 | 22 / 12 CAPACITANCE DECREASE |

*FIG. 6*

PHYSICAL QUANTITY SENSOR AND INERTIAL MEASUREMENT UNIT

The present application is based on, and claims priority from JP Application Serial Number 2022-024692, filed Feb. 21, 2022, the disclosure of which is hereby incorporated by reference herein in its entirety.

BACKGROUND

1. Technical Field

The present disclosure relates to a physical quantity sensor and an inertial measurement unit.

2. Related Art

JP-T-2021-524035 discloses a capacitive microelectromechanical acceleration sensor configured such that one or more rotor measurement plates and one or more stator measurement plates can measure movements of a proof mass in a direction of a sensing axis by capacitance measurement performed therebetween. In the acceleration sensor, one or more first rotor damping plates and one or more first stator damping plates form a first set of parallel plates orthogonal to a first damping axis, and the first damping axis is substantially orthogonal to the sensing axis.

In the acceleration sensor disclosed in JP-T-2021-524035, the damping plates are provided outside the proof mass, there is a problem in that the size of an element increases.

SUMMARY

An aspect of the present disclosure relates to a physical quantity sensor for detecting, when directions orthogonal to one another are defined as a first direction, a second direction, and a third direction, a physical quantity in the third direction. The physical quantity sensor includes: an anchor fixed to a substrate; a support beam having one end coupled to the anchor; a fixed electrode unit provided at the substrate; a movable body including a movable electrode unit and a frame unit, the movable electrode unit including a movable electrode facing the fixed electrode of the fixed electrode unit, the frame unit coupling the movable electrode unit and another end of the support beam; and a damper unit coupled to the frame unit, provided in a region surrounded by the support beam and the frame unit, and configured to damp vibration of the frame unit in the first direction.

Another aspect of the present disclosure relates to an inertial measurement unit including the physical quantity sensor described above and a controller configured to perform control based on a detection signal output from the physical quantity sensor.

BRIEF DESCRIPTION OF THE DRAWINGS

FIG. 3 is a perspective view showing a three-dimensional shape of a detector.

FIG. 6 is a perspective view of a damper unit.

DESCRIPTION OF EXEMPLARY EMBODIMENTS

Hereinafter, the embodiment will be described. The embodiment to be described below does not unduly limit contents described in the claims. In addition, all of the configurations described in the embodiment are not necessarily essential constituent elements.

1. Physical Quantity Sensor

Figure 1:
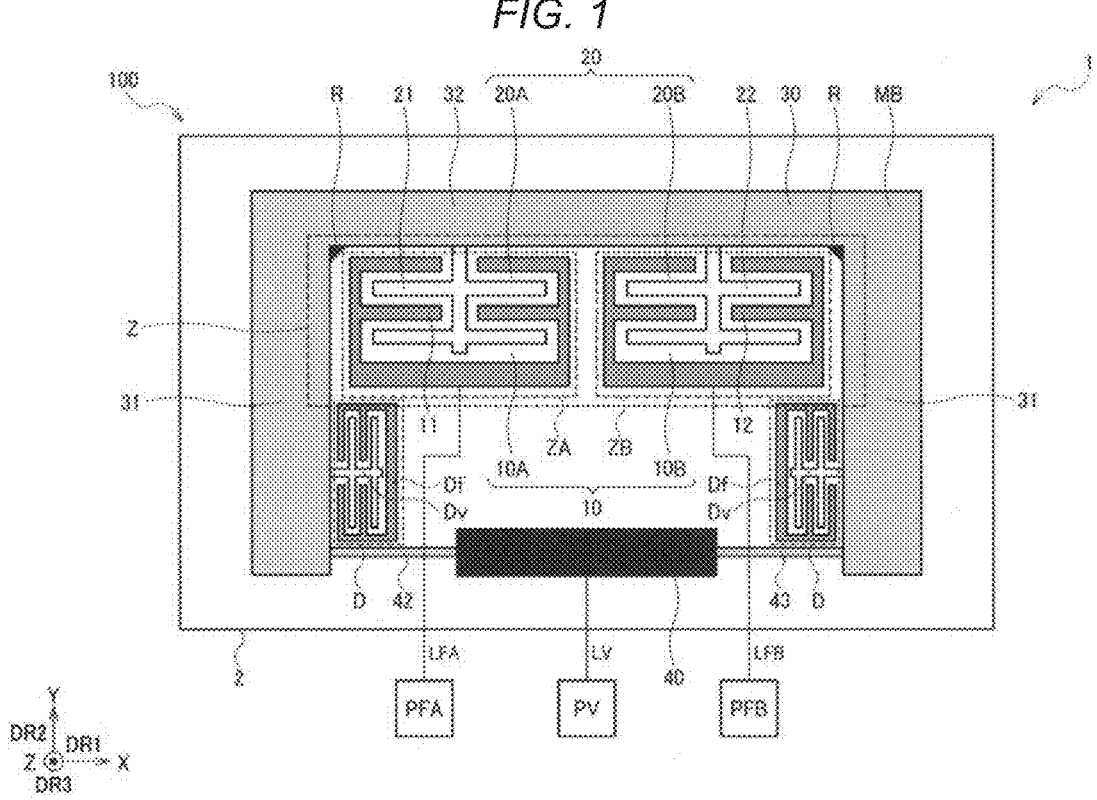
FIG. 1 is a plan view of a first configuration example of a physical quantity sensor according to an embodiment.

A configuration example of a physical quantity sensor 1 according to the embodiment will be described with reference to FIG. 1 by taking an acceleration sensor that detects acceleration in a vertical direction as an example. FIG. 1 is a plan view of a first configuration example of the physical quantity sensor 1 according to the embodiment. Here, the plan view is a plan view in a direction orthogonal to a substrate 2. The physical quantity sensor 1 is a micro electro mechanical systems (MEMS) device, and is, for example, an inertial sensor.

In FIG. 1 and FIGS. 2 to 12 to be described later, for convenience of description, dimensions of members, intervals between the members, and the like are schematically shown, and not all components are shown. For example, an electrode wiring, an electrode terminal, and the like are not shown. Further, in the following description, a case where a physical quantity detected by the physical quantity sensor 1 is the acceleration will be mainly described as an example, but the physical quantity is not limited to the acceleration and may be another physical quantity such as a velocity, pressure, displacement, an angular velocity, and gravity. The physical quantity sensor 1 may be used as a pressure sensor, a MEMS switch, or the like. In FIG. 1, directions orthogonal to one another are referred to as a first direction DR1, a second direction DR2, and a third direction DR3. The first direction DR1, the second direction DR2, and the third direction DR3 are, for example, an X-axis direction, a Y-axis direction, and a Z-axis direction, respectively, and are not limited thereto. For example, the third direction DR3 corresponding to the Z-axis direction is direction orthogonal to the substrate 2 of the physical quantity sensor 1, and is, for example, the vertical direction. A fourth direction DR4 is a direction opposite to the third direction DR3, and is, for example, a direction on a negative side in the Z-axis direction. The first direction DR1 corresponding to the X-axis direction and the second direction DR2 corresponding to the Y-axis direction are directions orthogonal to the third direction DR3, and an XY plane that is a plane along the first direction DR1 and the second direction DR2 is, for example, along a horizontal plane. The term "orthogonal" includes not only a case of crossing at 90° but also a case of crossing at an angle slightly inclined from 90°.

The substrate 2 is, for example, a silicon substrate made of semiconductor silicon or a glass substrate made of a glass material such as borosilicate glass. However, a constituent material of the substrate 2 is not particularly limited, and a quartz substrate, a silicon on insulator (SOI) substrate, or the like may be used.

As shown in FIG. 1, the physical quantity sensor 1 according to the embodiment includes a fixed electrode unit 10, a movable body MB, an anchor 40, support beams 42 and 43, and damper units D. The damper unit D includes a damper anchor Df and a damper movable unit Dv. The movable body MB includes a frame unit 30, a movable electrode unit 20, and reinforcers R, and the frame unit 30 includes first portions 31 extending in the second direction DR2 as a long-side direction and a second portion 32 extending in the first direction DR1 as the long-side direction. A first detection element 100 of the physical quantity sensor 1 includes the fixed electrode unit 10, the movable electrode unit 20, the movable body MB, the anchor 40, the support beams 42 and 43, and the damper units D. The first detection element 100 detects the physical quantity, for example, the acceleration in the third direction DR3, which is the Z-axis direction, in a detector ZA and a detector ZB. The first portion 31 of the frame unit 30 may be provided on each of left and right sides in the plan view as shown in FIG. 1.

The fixed electrode unit 10 includes a first fixed electrode group 10A and a second fixed electrode group 10B. The first fixed electrode group 10A and the second fixed electrode group 10B are provided at the substrate 2. The first fixed electrode group 10A and the second fixed electrode group 10B are fixed to the substrate 2 by the anchor. The first fixed electrode group 10A includes a plurality of fixed electrodes 11, and the second fixed electrode group 10B includes a plurality of fixed electrodes 12. The plurality of fixed electrodes 11 and the plurality of fixed electrodes 12 extend, for example, along the first direction DR1 which is the X-axis direction. That is, the plurality of fixed electrodes 11 are provided in a comb shape, and constitute the first fixed electrode group 10A. Similarly, the plurality of fixed electrodes 12 are provided in the comb shape and constitute the second fixed electrode group 10B. In the following description, the fixed electrodes 11 included in the first fixed electrode group 10A and the fixed electrodes 12 included in the second fixed electrode group 10B are collectively referred to as fixed electrodes 14 as appropriate.

The movable electrode unit 20 includes a first movable electrode group 20A and a second movable electrode group 20B. The first movable electrode group 20A includes a plurality of movable electrodes 21, and the second movable electrode group 20B includes a plurality of movable electrodes 22. As shown in FIG. 1, the plurality of movable electrodes 21 and the plurality of movable electrodes 22 are coupled to the second portion 32 of the frame unit 30, and extend, for example, along the first direction DR1 which is the X-axis direction. The plurality of movable electrodes 21 are provided in the comb shape and constitute the first movable electrode group 20A, and the plurality of movable electrodes 22 are provided in the comb shape and constitute the second movable electrode group 20B. For example, the movable electrodes 21 of the first movable electrode group 20A are respectively disposed to face the fixed electrodes 11 of the first fixed electrode group 10A in the second direction DR2 which is a Y direction. The movable electrodes 22 of the second movable electrode group 20B are respectively disposed to face the fixed electrodes 12 of the second fixed electrode group 10B in the second direction DR2. A portion where the fixed electrodes 11 and the movable electrodes 21 are disposed to face each other corresponds to the detector ZA of the first detection element 100, and a portion where the fixed electrodes 12 and the movable electrodes 22 are disposed to face each other corresponds to the detector ZB of the first detection element 100. In the following description, the movable electrodes 21 included in the first movable electrode group 20A and the movable electrodes 22 included in the second movable electrode group 20B are collectively referred to as movable electrodes 24 as appropriate.

The movable body MB moves along the support beams 42 and 43 with the first direction DR1 as a rotation axis. Here, the support beams 42 and 43 are, for example, torsion springs, and one end of each of the support beams 42 and 43 is fixed to the substrate 2 by the anchor 40. In FIG. 1, the support beam 42 extending from the anchor 40 in a direction opposite to the first direction DR1 and the support beam 43 extending from the anchor 40 to a first direction DR1 side are disposed on both sides of the anchor 40 in the first direction DR1. The frame unit 30 of the movable body MB is coupled to the other ends of the support beams 42 and 43 that are not coupled to the anchor 40 at the first portions 31. In this way, the movable body MB is formed in a substantially U-shape in a plan view in the third direction DR3 by the first portions 31 and the second portion 32 of the frame unit 30, and is coupled to the anchor 40 via the support beams 42 and 43.

The reinforcer R reinforces an intersection of the first portion 31 and the second portion 32. Specifically, as shown in FIG. 1, the reinforcer R is provided at the intersection of the first portion 31 and the second portion 32.

The damper unit D damps unnecessary vibration of the movable body MB. The damper anchor Df of the damper unit D is fixed to the substrate 2. In the plan view in the third direction DR3, the damper anchor Df has the comb shape similar to that of the first fixed electrode group 10A and the second fixed electrode group 10B. The damper movable unit Dv of the damper unit D is coupled to the frame unit 30 of the movable body MB, and can move integrally with the movable body MB. In the plan view in the third direction DR3, the damper movable unit Dv has a comb shape similar to that of the first movable electrode group 20A and the second movable electrode group 20B. Comb teeth of the damper anchor Df and the damper movable unit Dv are disposed to face each other in the first direction DR1, and constitute the damper unit D. In the first configuration example shown in FIG. 1, two damper units D are provided inside the frame unit 30 in the plan view in the third direction DR3.

In this way, the movable body MB is implemented, and can swing in the third direction DR3 by the support beams 42 and 43 designed to be twisted on the rotation axis. Then, the first detection element 100 having a so-called one-sided seesaw structure in which the movable body MB swings with the anchor 40 as an anchor is implemented. The frame unit 30 is designed such that a mass of a distal end portion thereof, that is, the second portion 32 is large and a moment of inertia I around the rotation axis is large.

Figure 2:
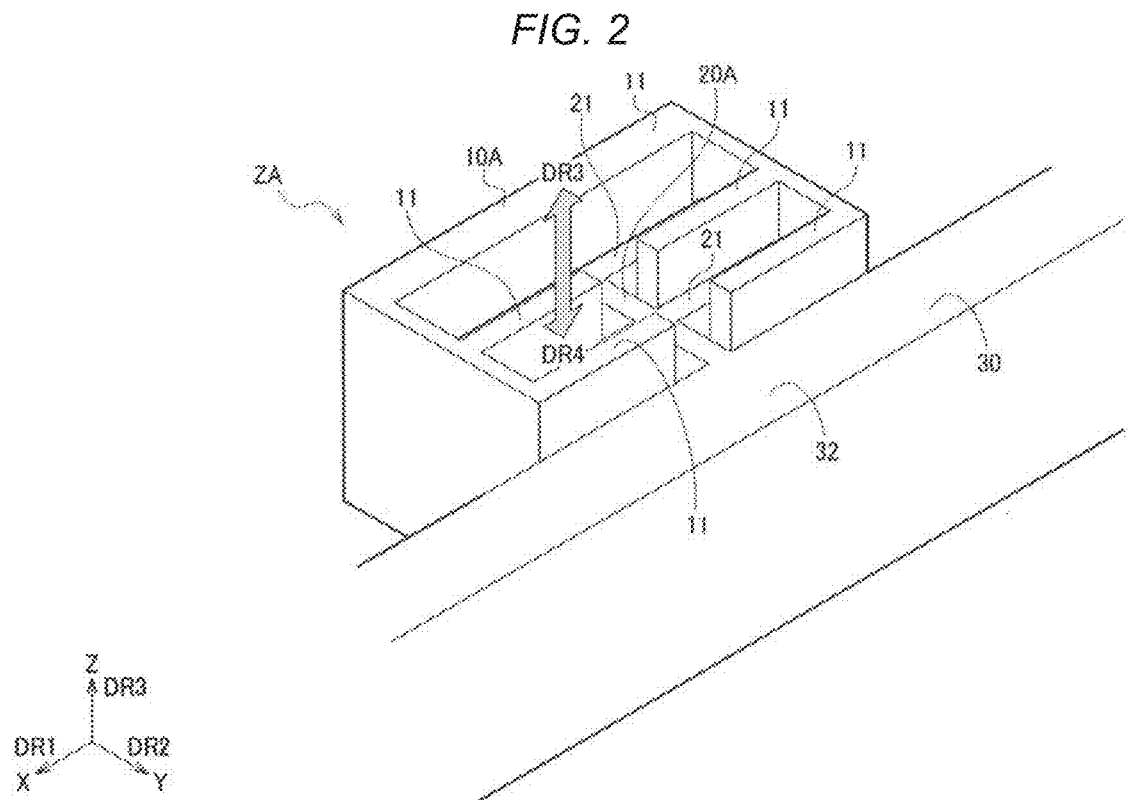
FIG. 2 is a perspective view showing a three-dimensional shape of a detector.
Figure 3:
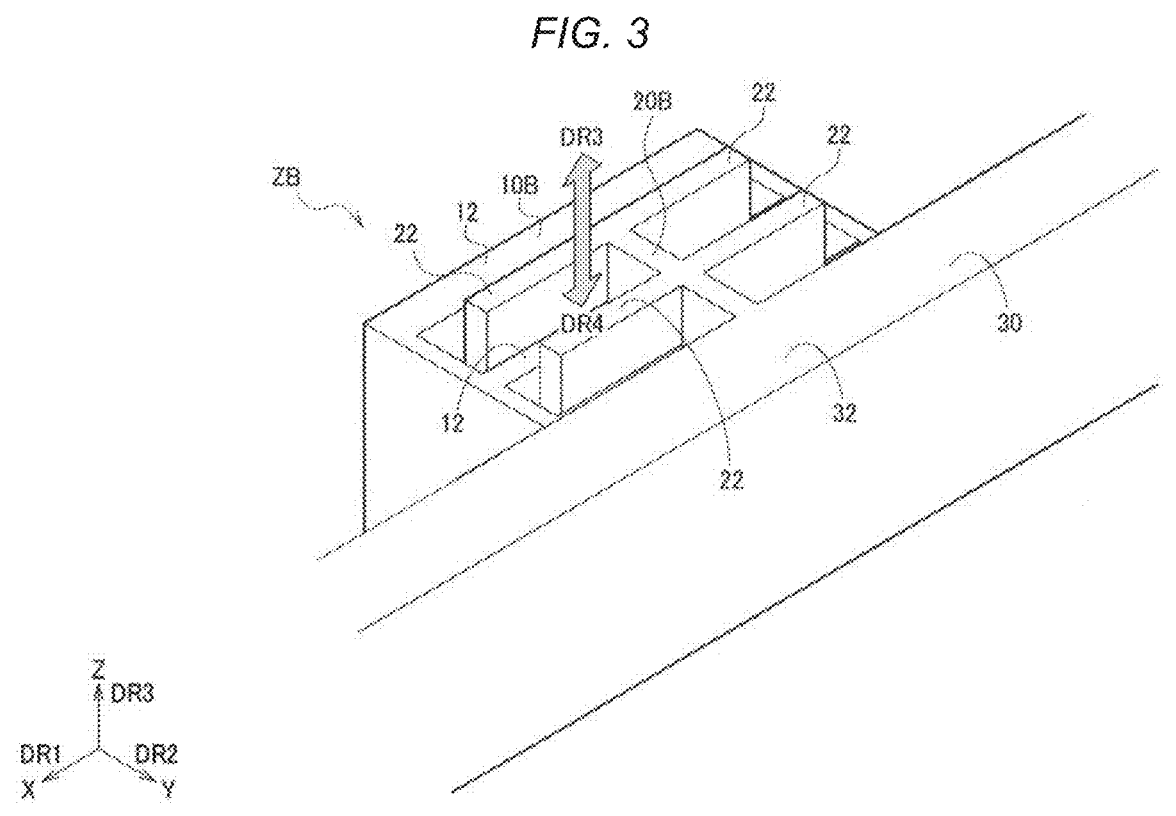

FIGS. 2 and 3 are perspective views showing three-dimensional shapes of the detector ZA and the detector ZB, respectively. FIG. 2 shows a disposition correlation between the first fixed electrode group 10A and the first movable electrode group 20A and shapes thereof in the third direction DR3. As described above, the fixed electrodes 11 of the first fixed electrode group 10A and the movable electrodes 21 of the first movable electrode group 20A are disposed to face each other in the second direction DR2, respectively. In the third direction DR3, the fixed electrode 11 and the movable electrode 21 have different thicknesses. Specifically, in the detector ZA, the thickness of the movable electrode 21 in the third direction DR3 is smaller than the thickness of the fixed electrode 11 in the third direction DR3. Since the thickness of the movable electrode 21 is thinner, the movable electrode 21 is recessed with respect to the fixed electrode 11 when viewed from the third direction DR3 side. The first movable electrode group 20A having such a shape can move along the third direction DR3 indicated by an arrow in FIG. 2 by moving along with a twisting movement of the movable body MB described above.

FIG. 3 shows a disposition correlation between the second fixed electrode group 10B and the second movable electrode group 20B and shapes thereof in the third direction DR3. Similarly to the detector ZA shown in FIG. 2, the fixed electrodes 12 and the movable electrodes 22 are disposed to face each other in the second direction DR2, respectively, and the fixed electrode 12 and movable electrode 22 have different thicknesses in the third direction DR3. In the detector ZB, the thickness of the movable electrode 22 in the third direction DR3 is larger than the thickness of the fixed electrode 12 in the third direction DR3. Therefore, when viewed from the third direction DR3 side, the fixed electrode 12 is recessed with respect to the movable electrode 22. The second movable electrode group 20B can move along the third direction DR3 indicated by an arrow in FIG. 3 by moving along with the twisting movement of the movable body MB described above.

Figure 4:
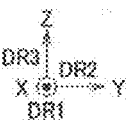
FIG. 4 is an explanatory diagram of operations of the detectors.

FIG. 4 is an explanatory diagram of operations of the detectors ZA and ZB in the first detection element 100. FIG. 4 shows movements of the fixed electrodes 11 and 12 and the movable electrodes 21 and 22 in a cross-sectional view along a YZ plane when a direction of the acceleration is the third direction DR3 and when the direction of the acceleration is the fourth direction DR4 as a state where the acceleration is generated from an initial state on the left. The initial state is a stationary state. Further, as will be described later, the detectors ZA and ZB correspond to an N side and a P side in the physical quantity detection of the physical quantity sensor 1, respectively.

First, in the initial state shown on a left side in FIG. 4, in both the detectors ZA and ZB, positions of end portions of the movable electrodes 21 and 22 and the fixed electrodes 11 and 12 on a fourth direction DR4 side coincide with each other and are flush with each other in a side view in the YZ plane. As described with reference to FIGS. 2 and 3, in the detector ZA, the end portion of the movable electrode 21 is recessed with respect to the end portion of the fixed electrode 11 on the third direction DR3 side. In the detector ZB, the end portion of the fixed electrode 12 is recessed with respect to the end portion of the movable electrode 22 on the third direction DR3 side. Therefore, the positions of the end portions of the movable electrodes 21 and 22 and the fixed electrodes 11 and 12 on the third direction DR3 side are not flush with each other.

Next, in a state where the acceleration is generated in the third direction DR3 shown in a center of FIG. 4, the movable electrode 21 of the detector ZA and the movable electrode 22 of the detector ZB receive an inertial force associated with the acceleration, and are displaced toward the fourth direction DR4 side. At this time, in the detector ZA, a facing area of the fixed electrode 11 and the movable electrode 21 in the second direction DR2 is reduced as the movable electrode 21 is displaced in the fourth direction DR4. On the other hand, in the detector ZB, since the fixed electrode 12 is recessed on the third direction DR3 side, a facing area of the fixed electrode 12 and the movable electrode 22 in the second direction DR2 is maintained constant even when the movable electrode 22 is displaced in the fourth direction DR4. In this way, when the acceleration in the third direction DR3 is generated, the facing area is reduced in the detector ZA, and the facing area is maintained constant in the detector ZB.

In a state where the acceleration is generated in the fourth direction DR4 shown on a right side of FIG. 4, the movable electrode 21 of the detector ZA and the movable electrode 22 of the detector ZB receive an inertial force associated with the acceleration, and are displaced toward the third direction DR3 side. At this time, since the movable electrode 21 is recessed on the third direction DR3 side in the detector ZA, the facing area of the fixed electrode 11 and the movable electrode 21 in the second direction DR2 is maintained constant even when the movable electrode 21 is displaced in the third direction DR3. In contrast, in the detector ZB, the facing area of the fixed electrode 12 and the movable electrode 22 in the second direction DR2 is reduced as the movable electrode 22 is displaced in the third direction DR3. In this way, when the acceleration is generated in the fourth direction DR4, the facing area is maintained constant in the detector ZA, and the facing area is reduced in the detector ZB.

In this way, when the acceleration in the third direction DR3 is generated, the facing area of the fixed electrode 11 and the movable electrode 21 in the detector ZA is reduced, and when the acceleration in the fourth direction DR4 is generated, the facing area of the fixed electrode 12 and the movable electrode 22 in the detector ZB is reduced. Therefore, the acceleration in the third direction DR3 and the fourth direction DR4 can be detected by detecting a decrease in the facing area in the detectors ZA and ZB as a change in a capacitance between the fixed electrode 14 and the movable electrode 24.

The fixed electrode 11 of the first fixed electrode group 10A and the movable electrode 21 of the first movable electrode group 20A are provided to face each other, and a parallel plate type capacitance is formed in the detector ZA. Similarly, the fixed electrode 12 of the second fixed electrode group 10B and the movable electrode 22 of the second movable electrode group 20B are provided to face each other, and a parallel plate type capacitance is formed in the detector ZB. For example, a change in the capacitance in the detector ZA can be detected as the N side, and a change in the capacitance in the detector ZB can be detected as the P side.

In FIG. 4, as shown in the case where the direction of the acceleration is the third direction DR3, when the acceleration in the third direction DR3 is generated in the physical quantity sensor 1, the movable electrode 24 receives the inertial force and is displaced to the fourth direction DR4 side. At this time, since the facing area of fixed electrode 12 and the movable electrode 22 in the detector ZB, that is, the facing area of fixed electrode 12 and the movable electrode 22 on the P side does not change, the capacitance thereof does not change. In contrast, the facing area of the fixed electrode 11 and the movable electrode 21 in the detector ZA, that is, the facing area of the fixed electrode 11 and the movable electrode 21 on the N side is reduced. Therefore, the acceleration in the third direction DR3 can be detected based on a difference between the electrostatic capacitances on the P side and the N side. On the contrary, when the acceleration in the fourth direction DR4 is generated, the facing area of the fixed electrode 12 and the movable electrode 22 in the detector ZB, that is, the facing area of the fixed electrode 12 and the movable electrode 22 on the P side is reduced, and the capacitance of the detector ZB is reduced, whereas the facing area of the fixed electrode 11 and the movable electrode 21 in the detector ZA, that is, the facing area of the fixed electrode 11 and the movable electrode 21 on the N side does not change, and the capacitance of the detector ZA does not change. Therefore, the acceleration in the fourth direction DR4 can be detected based on a difference between the electrostatic capacitances on the P side and the N side. The change in the capacitance can be detected by using, for example, a differential amplifier circuit QV (not shown). As shown in FIG. 1, the detection can be implemented by coupling the first fixed electrode group 10A via a wiring LFA and a pad PFA, coupling the second fixed electrode group 10B via a wiring LFB and a pad PFB, and coupling the movable body MB via a wiring LV and a pad PV, to the differential amplifier circuit QV (not shown).

A method of providing an offset in the end portions between the fixed electrode 11 and the movable electrode 21 or between the fixed electrode 12 and the movable electrode 22 in the third direction DR3 is not limited to the above-described method. For example, the physical quantity in the third direction DR3 can also be detected by providing an offset by reducing the thickness of the fixed electrode 11 of the detector ZA in the third direction DR3 and reducing the thickness of the movable electrode 22 of the detector ZB in the third direction DR3.

Figure 5:
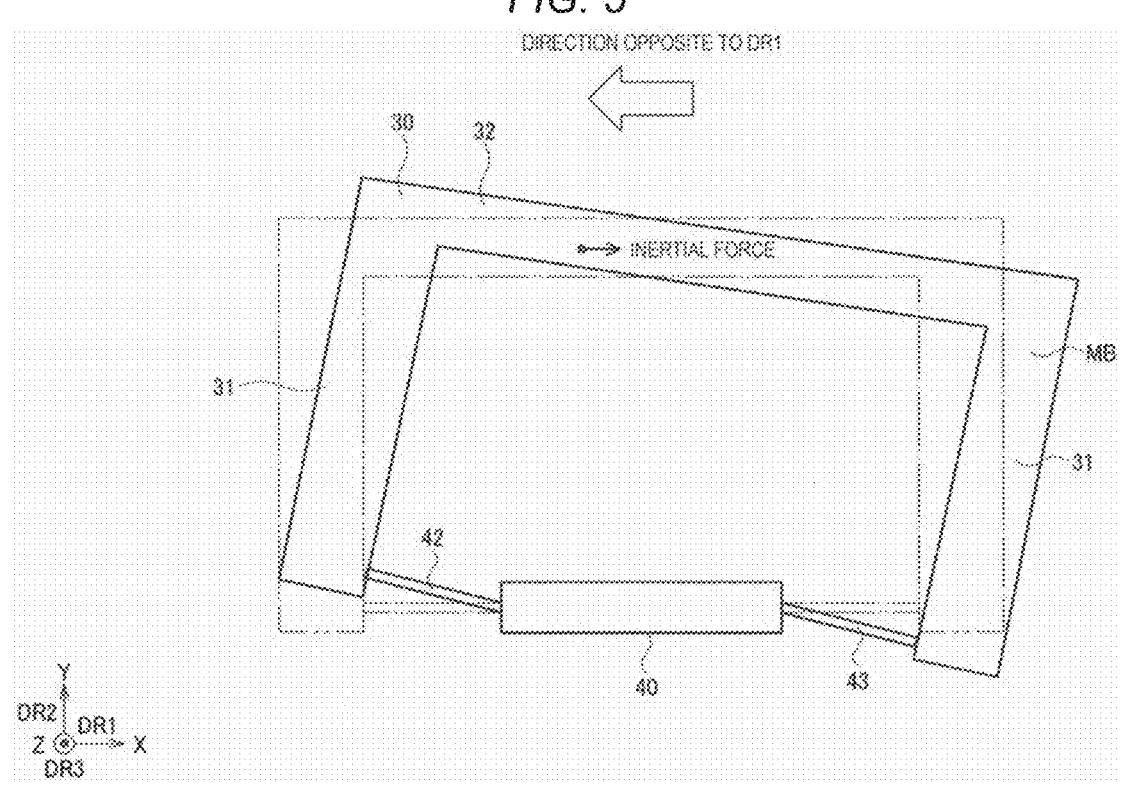
FIG. 5 is an explanatory diagram when a frame unit is deformed.

Next, the twisting movement of the movable body MB around the rotation axis along the support beams 42 and 43 will be specifically examined. FIG. 5 is a view of the anchor, the movable body MB, and the support beams 42 and 43 according to the first configuration example shown in FIG. 1, when viewed in a plan view in the third direction DR3. Further, a case where acceleration on a side in a direction opposite to the first direction DR1 that is acceleration in a direction other than the third direction DR3 is generated is shown. In this case, the movable body MB receives an inertial force on the first direction DR1 side which is the side in a direction opposite to the acceleration. Here, the movable body MB is coupled to the other ends of the support beams 42 and 43 each having one end fixed to the anchor 40, and is basically movable only in the Z direction, but since the support beams 42 and 43 have constant elasticity, the movable body MB moves in the XY plane as shown in FIG. 5. FIG. 5 shows a state before the frame unit 30 and the support beams 42 and 43 indicated by broken lines receive the inertial force, and a state where the frame unit 30 and the support beams 42 and 43 indicated by solid lines are displaced by receiving the inertial force. In this case, in the frame unit 30, an intersection angle between the first portion 31 and the second portion 32 that originally intersect with each other at a right angle also changes, and the frame unit 30 becomes a shape close to a parallelogram. When rigidity of a coupling portion between the first portion 31 and the second portion 32 of the frame unit 30 is insufficient, this tendency is remarkable, and the frame unit 30 receives the inertial force in the first direction DR1 and is greatly deformed. Further, when the deformation of the frame unit 30 occurs repeatedly, a problem such as a crack occurring in a corner portion of the frame unit 30 may occur. In FIG. 5, the support beams 42 and 43 are shown larger than an actual size to visualize distortion of the support beams 42 and 43.

When such a movement of the movable body MB occurs, the electrostatic capacitances of the fixed electrode 14 and the movable electrode 24 are affected. For example, in the detector ZA, a facing distance between the fixed electrode 11 and the movable electrode 21 changes, and the capacitance also changes. Further, in the detector ZB, a facing distance between the fixed electrode 12 and the movable electrode 22 changes, and the capacitance changes. Similarly, when acceleration on the second direction DR2 side is generated, since the movable electrode 24 is displaced by receiving an inertial force in a direction opposite to the acceleration in the second direction DR2, a facing distance between the fixed electrode 14 and the movable electrode 24 changes and the capacitance also changes. Therefore, when the acceleration in a direction other than the third direction DR3 is generated in the physical quantity sensor 1, the elasticity of the support beams 42 and 43 affects the detection of the acceleration in the third direction DR3. Sensitivity obtained by the physical quantity sensor detecting a physical quantity in a direction other than a detection target direction as a physical quantity in the detection target direction is referred to as cross-axis sensitivity. Then, it is desirable to design the physical quantity sensor to minimize the cross-axis sensitivity.

Figure 6:
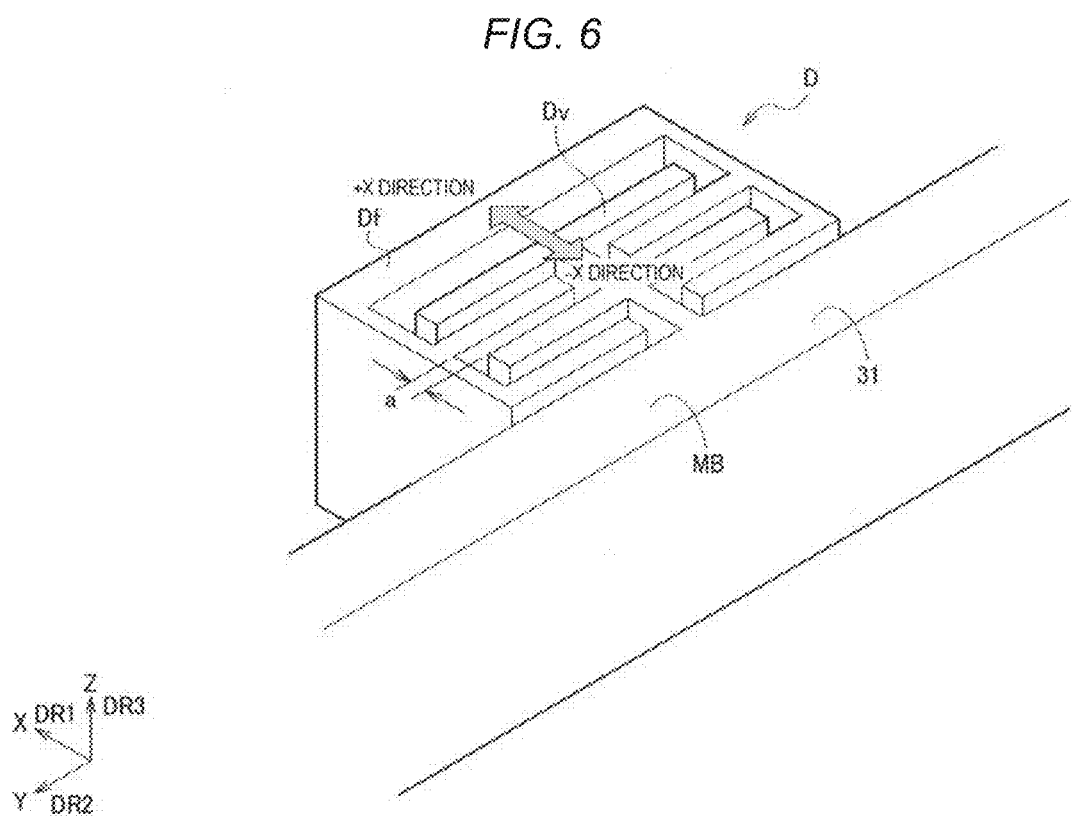

The damper unit D of the physical quantity sensor 1 shown in FIG. 1 is provided from a viewpoint of preventing the cross-axis sensitivity. FIG. 6 is a perspective view of the damper unit D according to the embodiment. As described above, the damper unit D includes the damper anchor Df and the damper movable unit Dv. The damper anchor Df and the damper movable unit Dv have shapes substantially similar to shapes of the fixed electrode 11 and the movable electrode 21 in the detector ZA described with reference to FIG. 2 or shapes of the fixed electrode 12 and the movable electrode 22 in the detector ZB described with reference to FIG. 3 in the plan view in the third direction DR3. Since the damper unit D is not a unit that detects the acceleration, the damper anchor Df and the damper movable unit Dv have the same thickness in the third direction DR3.

As described with reference to FIG. 5, when the movable body MB is displaced by receiving the inertial force in the first direction DR1, the damper movable unit Dv coupled to the first portion 31 of the frame unit 30 is also displaced integrally with the frame unit 30. Here, the damper anchor Df and the damper movable unit Dv are displaced in a direction in which a facing distance changes with respect to the inertial force in the first direction DR1. Therefore, in a space between the damper anchor Df and the damper movable unit Dv, air resistance received by the damper movable unit Dv acts to prevent the displacement in the first direction DR1, and the displacement of the movable body MB in the first direction DR1 is prevented. Further, when large acceleration is applied to the physical quantity sensor 1, the damper movable unit Dv of the damper unit D collides with the damper anchor Df, and therefore unnecessary displacement or vibration in a direction other than the third direction DR3 can be prevented. Therefore, the damper unit D also serves as a stopper. In this way, the damper unit D plays a role of damping the unnecessary displacement and the unnecessary vibration in the direction other than the third direction DR3 of the movable body MB when the acceleration in the direction other than the third direction DR3 is generated in the movable body, and prevents the cross-axis sensitivity of the physical quantity sensor 1.

As described above, the damper unit D prevents the cross-axis sensitivity of the physical quantity sensor 1 by damping the unnecessary vibration of the movable body MB. Therefore, a damping effect can be improved by increasing a facing area of a comb tooth of the damper anchor Df and a comb tooth of the damper movable unit Dv and reducing the facing distance between the comb tooth shown by a in FIG. 6. Further, the effect increases in proportion to the facing area.

Figure 7:
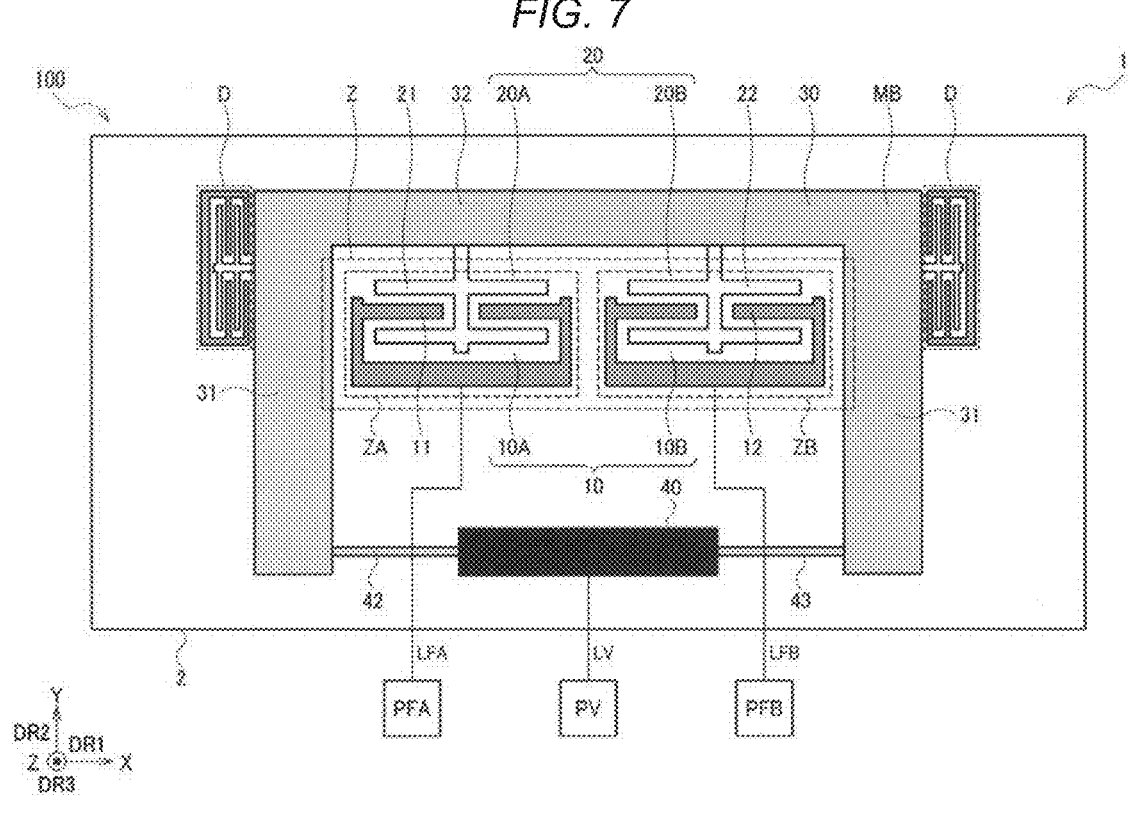
FIG. 7 is a plan view of a comparative example of the physical quantity sensor according to the embodiment.

FIG. 7 shows a physical quantity sensor disclosed in JP-T-2021-524035 as a comparative example of the embodiment. Also in the comparative example, the one-sided seesaw structure in which the movable body MB swings with the anchor 40 as an anchor is used. The comparative example also includes the damper units D as in the embodiment. However, in the comparative example shown in FIG. 7, unlike the embodiment, the damper unit D is provided outside the movable body MB.

In recent years, there is an increasing need for miniaturization of the physical quantity sensor, and it is desired to implement a more miniaturized physical quantity sensor while maintaining highly accurate detection of the physical quantity. In this regard, by providing the damper unit D outside the movable body MB as shown in FIG. 7, a size of the physical quantity sensor is large, which means the miniaturization of the physical quantity sensor cannot be implemented. In this regard, according to the embodiment, since the damper unit D is disposed inside the movable body MB, a space surrounded by the movable body MB can be effectively used, which is advantageous for the miniaturization of the physical quantity sensor 1.

In this way, the physical quantity sensor 1 according to the embodiment includes the anchor 40 fixed to the substrate 2, the support beams 42 and 43, the fixed electrode unit 10, the movable body MB, and the damper units D. The fixed electrode unit 10 is provided at the substrate 2. One end of each of the support beams 42 and 43 is coupled to the anchor 40. The movable body MB includes the movable electrode unit 20 and the frame unit 30. The movable electrode unit 20 includes the movable electrodes 21 and 22 facing the fixed electrodes 11 and 12 of the fixed electrode unit 10. The frame unit 30 couples the movable electrode unit 20 and the other ends of the support beams 42 and 43. The damper units D are coupled to the frame unit 30, are respectively provided in regions surrounded by the support beams 42 and 43 and the frame unit 30, and damp the vibration of the frame unit 30 in the first direction DR1. In this way, the damper unit D can be housed inside the movable body MB, and the physical quantity sensor 1 can be miniaturized.

In the embodiment, the frame unit 30 includes the first portions 31 having one ends coupled to the other ends of the support beams 42 and 43 and extending with the second direction DR2 as the long-side direction, and the second portion 32 coupled to the other ends of the first portions 31 and extending with the first direction DR1 as the long-side direction. The damper units D are coupled to the first portions 31 in the regions surrounded by the support beams 42 and 43 and the frame unit 30.

In this way, the movable body MB can move in the third direction DR3 around the rotation axis along the support beams 42 and 43. Further, when the movable body is displaced in a direction other than the third direction DR3, the damper unit D coupled to the first portion 31 of the frame unit 30 can prevent the displacement of the movable body MB, and can prevent the cross-axis sensitivity of the physical quantity sensor 1.

In the embodiment, the support beams 42 and 43, the fixed electrode unit 10, and the movable electrode unit 20 may be arranged in the second direction DR2 in an order of the support beams 42 and 43, the fixed electrode unit 10, and the movable electrode unit 20, and the damper units D may be provided between the fixed electrode unit 10 and the support beams 42 and 43 in the second direction DR2.

In this way, the support beams 42 and 43, the fixed electrode unit 10, and the damper units D can be disposed compactly in the second direction DR2.

Figure 8:
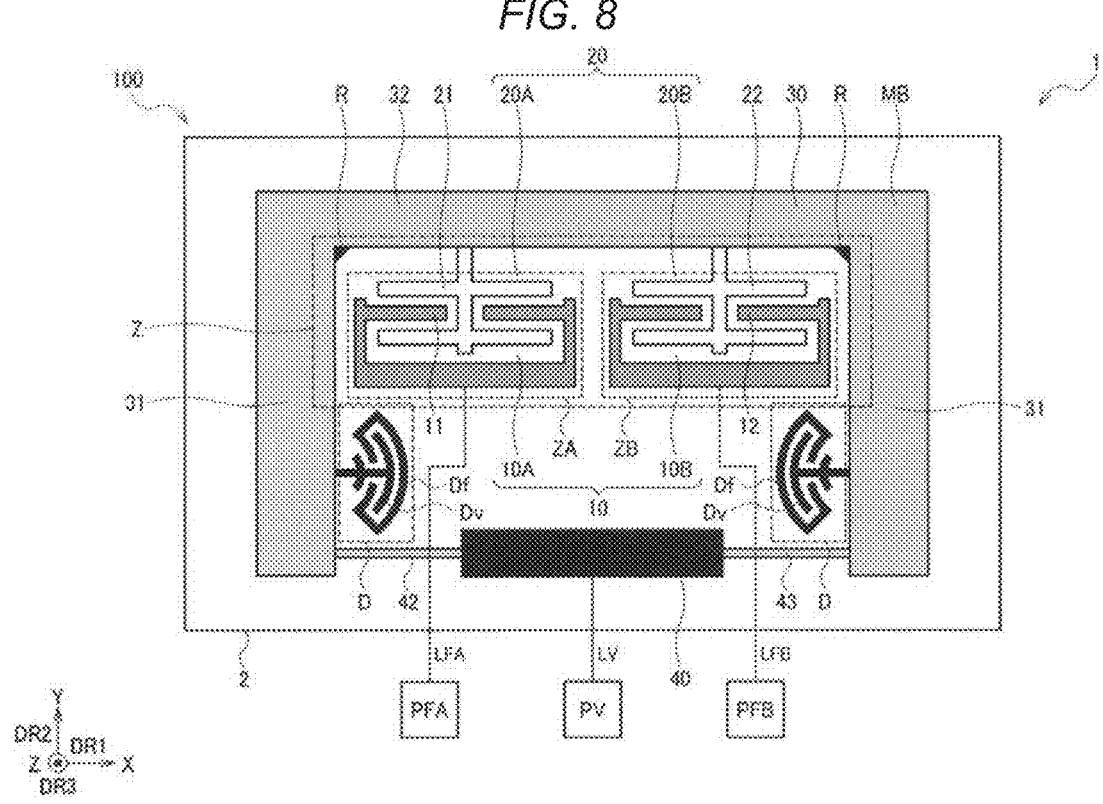
FIG. 8 is a plan view of a modification of the first configuration example.

FIG. 8 shows a modification of the physical quantity sensor 1 shown in FIG. 1. A configuration of the damper unit D is different from that of the first configuration example shown in FIG. 1. Specifically, in the plan view in the third direction DR3, the damper anchor Df and the damper movable unit Dv have an arc shape as a whole. In this way, even when the facing distance between the damper anchor Df and the damper movable unit Dv is the same, larger air resistance can be generated, which is effective in preventing the cross-axis sensitivity. Therefore, the detection accuracy of the physical quantity of the physical quantity sensor 1 can be improved.

Figure 9:
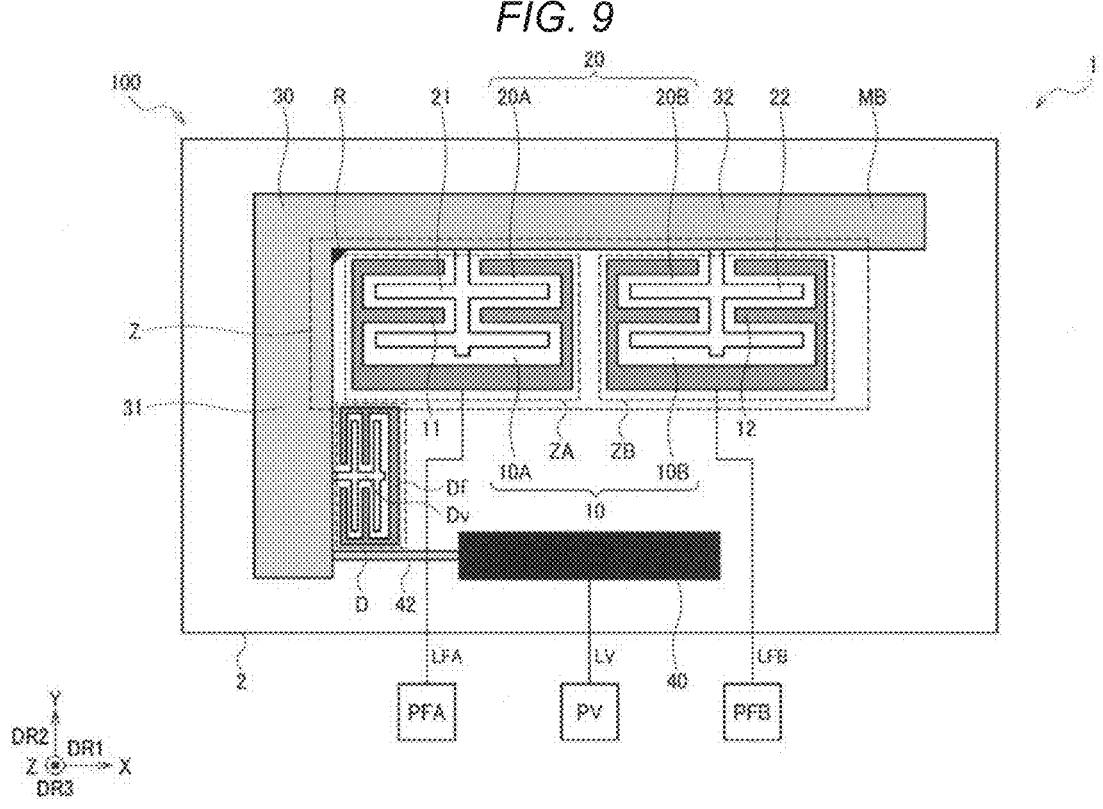
FIG. 9 is a plan view of a modification of the first configuration example.

In the above description, the physical quantity sensor 1 is described as having a configuration in which the frame unit 30 has two first portions 31, but the physical quantity sensor 1 according to the embodiment may have one first portion 31 as shown in FIG. 9. In this case, since the number of the first portions 31 is one, the number of the damper units D is also one.

2. Reinforcer

According to a configuration of the comparative example shown in FIG. 7, the damper unit D is disposed outside the movable body MB, and it is not necessary to dispose the damper unit D to be housed in a limited space inside the movable body MB. Therefore, the facing area and the facing distance of the comb tooth of the damper anchor Df and the comb tooth of the damper movable unit Dv can be designed to be large, and the damping effect of the movable body MB in the direction other than the third direction DR3 can be improved.

In the first configuration example shown in FIG. 1, unlike JP-T-2021-524035, the damper units D are disposed inside the movable body MB, which is advantageous in the miniaturization of the physical quantity sensor 1. However, when the damper unit D is reduced in size as described above, it is considered that a sufficient damping effect of the damper unit D cannot be obtained as described with reference to FIG. 6. Therefore, in the embodiment, the reinforcer R is provided.

In the embodiment, as shown in FIG. 1, the reinforcer R is provided inside the intersection of the first portion 31 and the second portion 32 of the frame unit 30, and plays a role of fixing the intersection angle between the first portion 31 and the second portion 32. Therefore, even when the damping effect of the damper unit D is reduced by housing the damper unit D inside the movable body MB in the embodiment, the frame unit 30 is less likely to be deformed by the reinforcer R. Therefore, the cross-axis sensitivity caused by the reduction in the size of the damper unit D can be prevented. That is, by providing the reinforcer R in the frame unit 30, the rigidity in the first direction DR1 can be increased and vibration disturbance can be prevented. A shape of the reinforcer R in the plan view in the third direction DR3 may not be a right triangle as shown in FIG. 1. In addition, since the reinforcer R is provided in a dead space inside the intersection of the first portion 31 and the second portion 32 of the frame unit 30, the size of the physical quantity sensor 1 is not increased. Therefore, in the embodiment, the damper unit D is housed inside the movable body MB, and the reinforcer R is also provided, thereby achieving both miniaturization and detection of the physical quantity with high accuracy of the physical quantity sensor 1.

That is, in the embodiment, the frame unit 30 includes the first portions 31 having one ends coupled to the other ends of the support beams 42 and 43 and extending with the second direction DR2 as the long-side direction, the second portion 32 coupled to the other ends of the first portions 31 and extending with the first direction DR1 as the long-side direction, and the reinforcers R provided at the intersections of the first portions 31 and the second portion 32.

In this way, the frame unit 30 can perform the twisting movement around the rotation axis along the support beams 42 and 43. Since the reinforcer R is provided at the intersection of the first portion 31 and the second portion 32, coupling between the first portion 31 and the second portion 32 can be reinforced. Therefore, the reinforcer R can prevent the deformation of the frame unit 30, and can prevent the cross-axis sensitivity of the physical quantity sensor 1. Therefore, the physical quantity can be detected with the high accuracy.

In the embodiment, the reinforcer R is a reinforcer that fixes the intersection angle between the first portion 31 and the second portion 32. In this way, the intersection angle between the first portion 31 and the second portion 32 of the frame unit 30 does not deviate from 90 degrees and is not deformed when the acceleration in a direction other than the third direction DR3 is received. Therefore, the cross-axis sensitivity of the physical quantity sensor 1 can be prevented and the physical quantity can be detected with the high accuracy.

3. Other Configuration Examples

Figure 10:
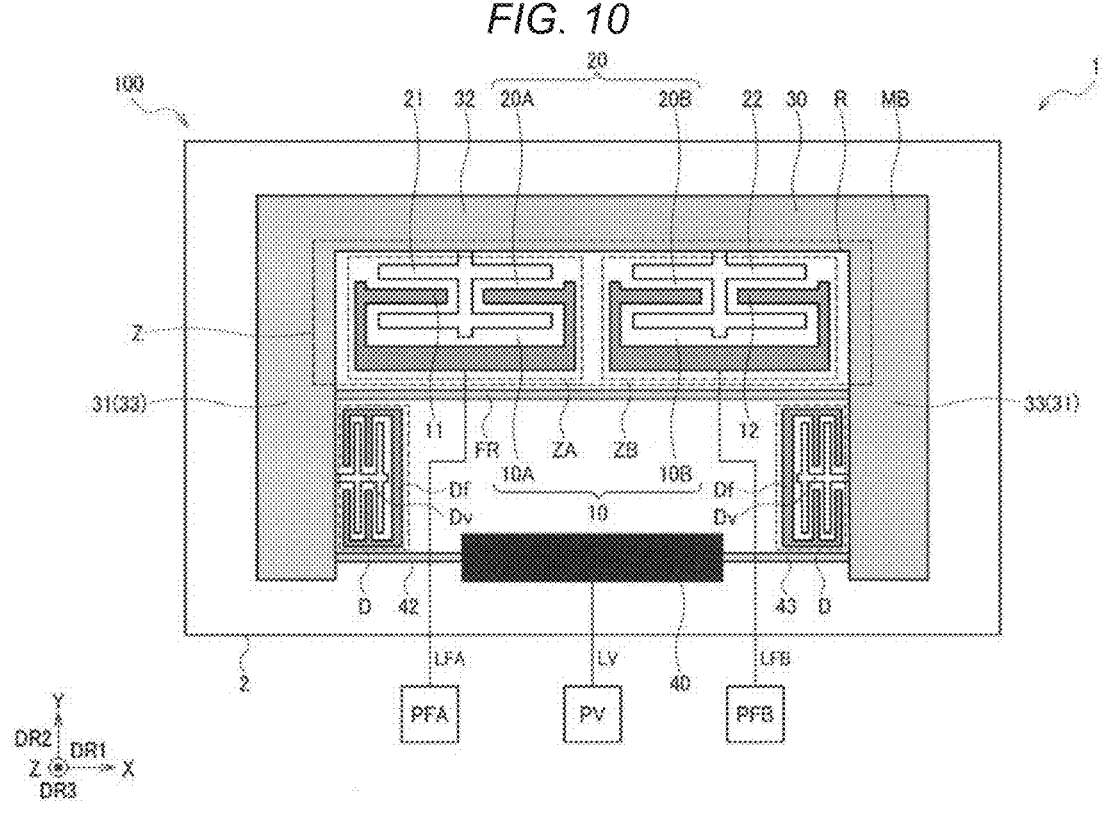
FIG. 10 is a plan view of a second configuration example of the physical quantity sensor according to the embodiment.

Next, another configuration example according to the embodiment will be described. FIG. 10 is a plan view of a second configuration example according to the embodiment. The second configuration example is different from the first configuration example in that a frame reinforcer FR is provided. In the second configuration example, the reinforcer R is not provided.

In the second configuration example, the frame unit 30 includes the third portion 33 in addition to the first portion 31 and the second portion 32. As shown in FIG. 10, the frame unit 30 is formed in a substantially U-shape in the plan view by the first portion 31, the second portion 32, and the third portion 33. Here, the third portion 33 corresponds to one first portion 31 of the two first portions 31 in the configuration example described with reference to FIG. 1. A case where the first portion 31 on a right side of a sheet of FIG. 10 and the third portion 33 on a left side of the sheet of FIG. 10 are shown in parentheses.

The frame reinforcer FR reinforces the shape of the frame unit 30. As shown in FIG. 10, the frame reinforcer FR has a rectangular shape having a long side in the first direction DR1 coupling the first portion 31 and the third portion 33 of the frame unit 30. That is, the frame reinforcer FR can fix positions of the first portion 31 and the third portion 33 in the rotational movement around the rotation axis of the movable body MB. Therefore, for example, in FIG. 5, when the inertial force in the first direction is applied to the movable body MB, the shape of the frame unit 30 is distorted into the parallelogram shape, and even when such a force is applied, the shape of the frame unit 30 is less likely to be distorted. Therefore, the frame reinforcer FR can play the same role as the reinforcer R that reinforces the frame unit 30 in the first configuration example. Therefore, in the second configuration example, the frame reinforcer FR is provided instead of the reinforcer R.

That is, in the embodiment, the frame reinforcer FR that reinforces the frame unit 30 is provided between the fixed electrode unit 10 and the support beams 42 and 43.

In this way, the fixed electrode unit 10, the support beams 42 and 43, and the frame reinforcer FR can be disposed compactly in the second direction DR2, and the distortion of the shape of the frame unit 30 can be prevented. Therefore, the miniaturized physical quantity sensor 1 having high detection accuracy can be implemented.

In the embodiment, the frame unit 30 includes the first portion 31 having one end coupled to the other end of the support beam 42 or 43 and extending with the second direction DR2 as the long-side direction, the second portion 32 having one end coupled to the other end of the first portion 31 and extending with the first direction DR1 as the long-side direction, and the third portion 33 having one end coupled to the other end of the second portion 32 and extending with the second direction DR2 as the long-side direction, and the frame reinforcer FR is coupled to the first portion 31 and the third portion 33.

In this way, even when a force in a direction other than the third direction DR3 is applied to the movable body MB, the shape of the frame unit 30 in the plan view can be maintained constant. Therefore, the cross-axis sensitivity of the physical quantity sensor 1 can be prevented, and the detection accuracy of the physical quantity can be improved.

Figure 11:
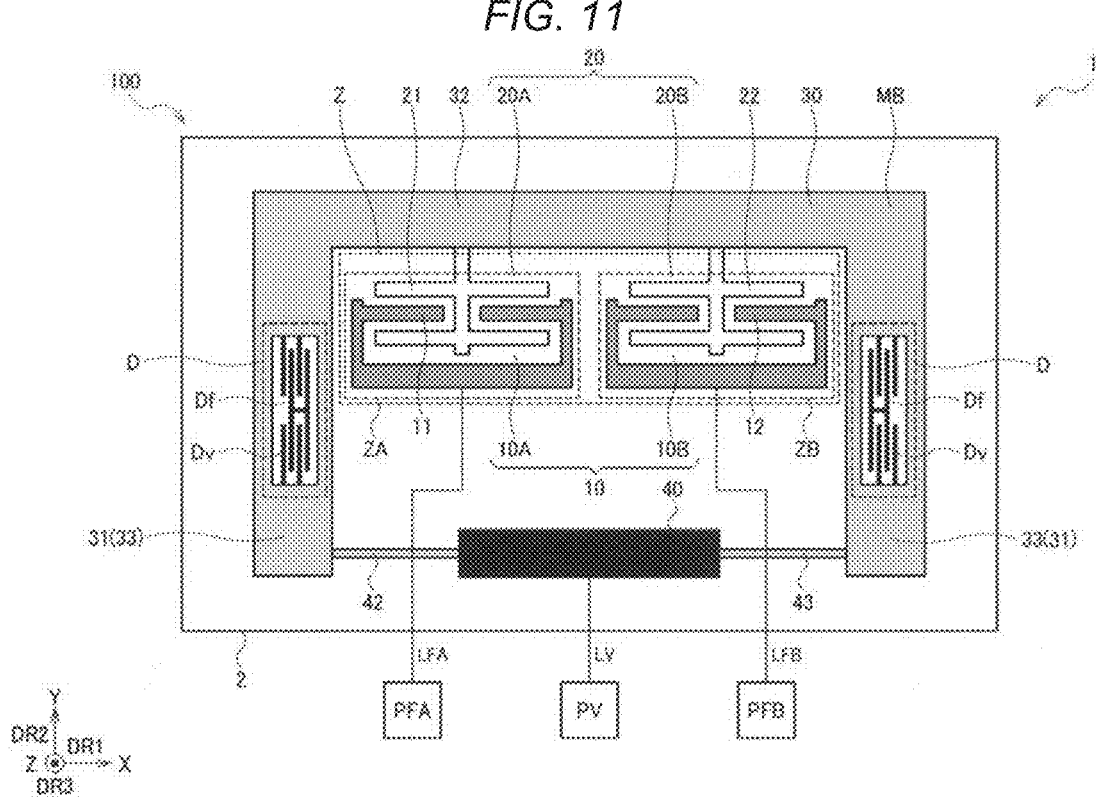
FIG. 11 is a plan view of a third configuration example of the physical quantity sensor according to the embodiment.

FIG. 11 is a plan view of a third configuration example according to the embodiment. The configuration of the damper unit D is different from that of the second configuration example shown in FIG. 10. Specifically, in the third configuration example, the damper unit D is provided in the first portion 31 of the frame unit 30 in the plan view. In the third configuration example, the damper anchor Df of the damper unit D is provided in a rectangular region opened in a part of the frame unit 30. The damper movable unit Dv of the damper unit D is integrated with the first portion 31 of the frame unit 30, and the comb teeth thereof are provided to extend from the first portion 31 into an opening. In this way, in the third configuration example, the comb teeth of the damper anchor Df and the damper movable unit Dv are provided to face each other in the first direction DR1 in the opening provided in the first portion of the frame unit 30. Therefore, for example, when the unnecessary vibration in the first direction DR1 is generated, the vibration can be damped by the air resistance between the comb teeth of the damper anchor Df and the damper movable unit Dv.

In the third configuration example, it is not necessary to provide a separate space for providing the damper unit D, which is effective in miniaturizing the physical quantity sensor 1. However, from a viewpoint of maintaining the rigidity of the frame unit 30, a size of the opening provided in the first portion 31 of the frame unit 30 is restricted. Therefore, for example, as compared with the second configuration example, restrictions on the lengths of the comb teeth of the damper anchor Df and the damper movable unit Dv provided in the opening are also increased. That is, in the third configuration example, the damping effect of the damper unit D is obtained within a range of the restriction of maintaining the rigidity of the frame unit 30. Therefore, to ensure the damping function, the role of the reinforcer R is more important.

Figure 12:
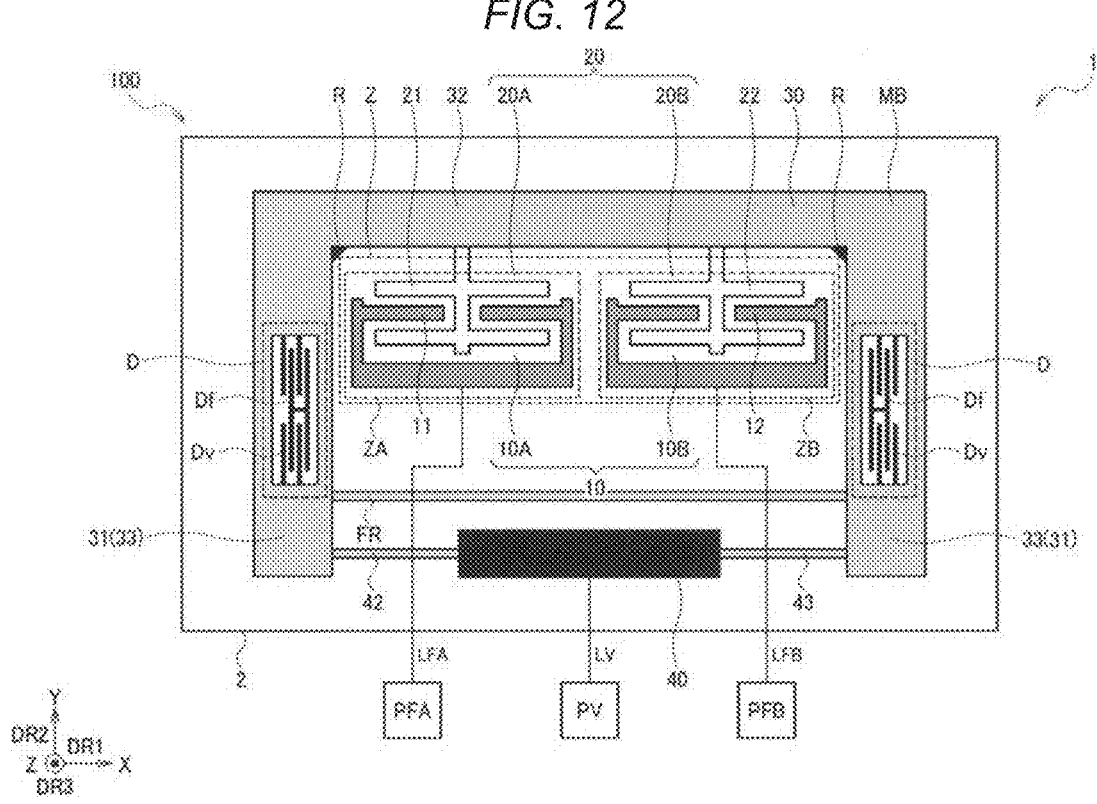
FIG. 12 is a plan view of a modification of the third configuration example.

FIG. 12 is a modification of the third configuration example. The modification is different from the third configuration example in that the frame reinforcer FR is provided. As described above, in the third configuration example, since a certain restriction is imposed on the damping effect of the damper unit D, by providing the frame reinforcer FR in addition to the reinforcer R, the frame unit 30 is less likely to be deformed. In this way, even in a configuration in which the damper unit D is provided in the frame unit 30, unnecessary vibration can be prevented, the cross-axis sensitivity can be prevented, and the physical quantity sensor 1 having the high accuracy can be implemented.

4. Inertial Measurement Unit

Figure 13:
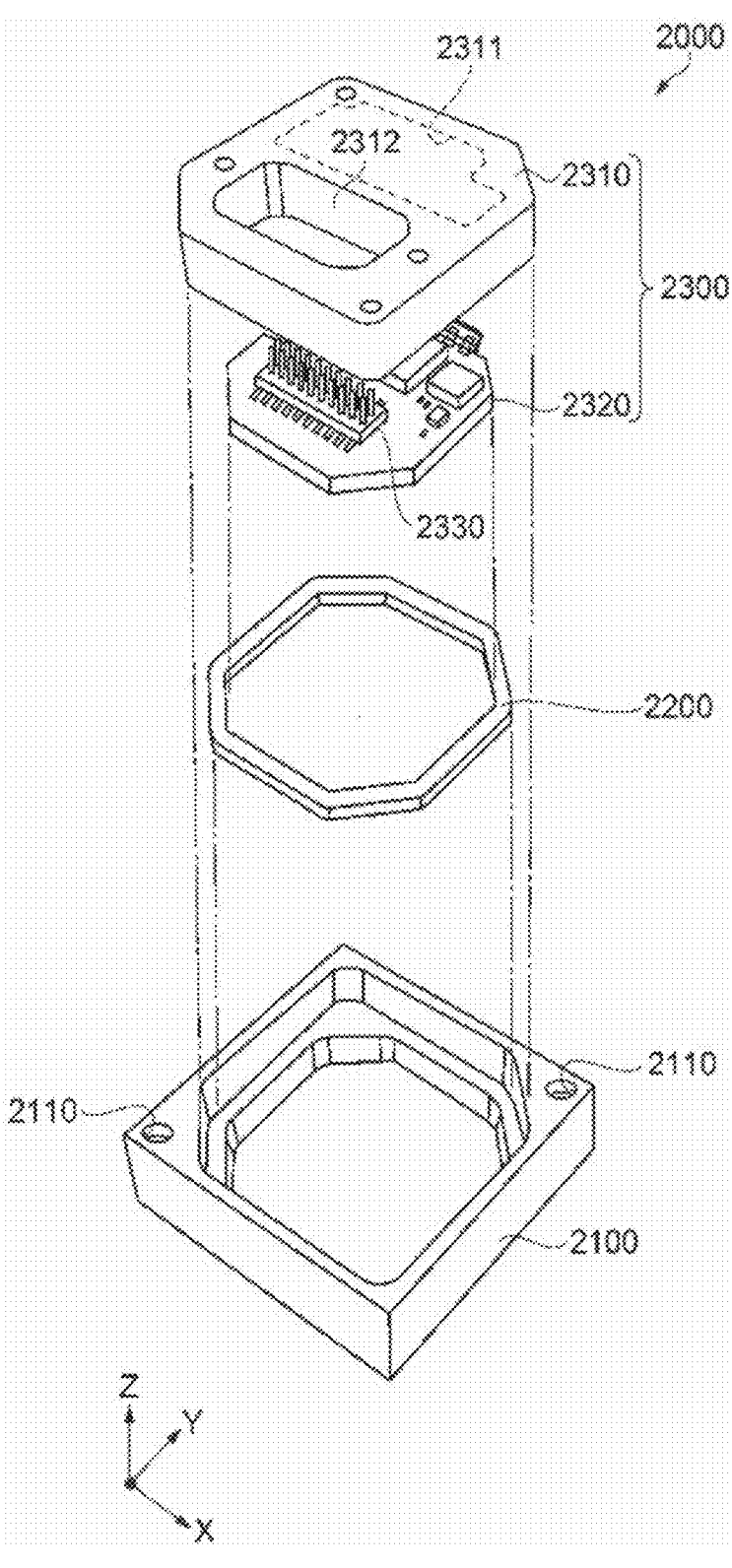
FIG. 13 is an exploded perspective view showing a schematic configuration of an inertial measurement unit having the physical quantity sensor.

Next, an example of an inertial measurement unit 2000 according to the embodiment will be described with reference to FIGS. 13 and 14. The inertial measurement unit (IMU) 2000 shown in FIG. 13 is a unit that detects an inertial movement amount of a posture or a behavior of a moving body such as an automobile or a robot. The inertial measurement unit 2000 is a so-called six-axis motion sensor including an acceleration sensor that detects acceleration ax, ay, and az in directions along three axes and an angular velocity sensor that detects angular velocities ωx, ωy, and ωz around the three axes.

The inertial measurement unit 2000 is a rectangular parallelepiped having a substantially square planar shape. Screw holes 2110 as mount portions are formed in the vicinity of two vertexes positioned in a diagonal direction of the square. Two screws can be inserted into the two screw holes 2110 to fix the inertial measurement unit 2000 to a mounted surface of a mounted body such as an automobile. It is also possible to reduce a size to a degree that can be mounted on a smartphone or a digital camera, for example, by selecting a component or changing a design.

The inertial measurement unit 2000 includes an outer case 2100, a bonding member 2200, and a sensor module 2300, and has a configuration in which the sensor module 2300 is inserted inside the outer case 2100 with the bonding member 2200 interposed therebetween. The sensor module 2300 includes an inner case 2310 and a circuit board 2320. The inner case 2310 is formed with a recess 2311 for preventing contact with the circuit board 2320 and an opening 2312 for exposing a connector 2330 to be described later. Further, the circuit board 2320 is bonded to a lower surface of the inner case 2310 via an adhesive.

Figure 14:
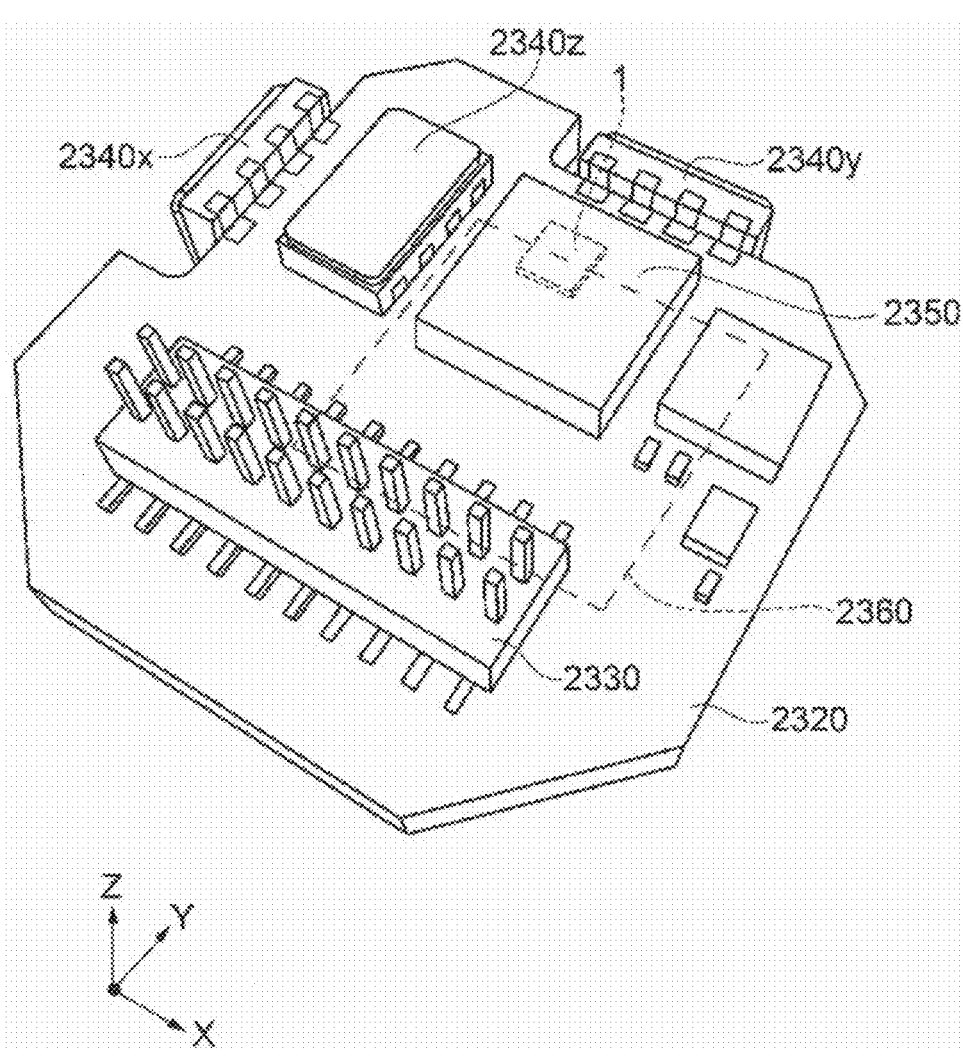
FIG. 14 is a perspective view of a circuit board of the inertial measurement unit.

As shown in FIG. 14, the connector 2330, an angular velocity sensor 2340z that detects an angular velocity around a Z axis, an acceleration sensor unit 2350 that detects acceleration in each axial direction of an X axis, a Y axis, and the Z axis, and the like are mounted at an upper surface of the circuit board 2320. Further, an angular velocity sensor 2340x that detects an angular velocity around the X axis and an angular velocity sensor 2340y that detects an angular velocity around the Y axis are mounted at side surfaces of the circuit board 2320.

The acceleration sensor unit 2350 includes at least the physical quantity sensor 1 for measuring the acceleration in the Z-axis direction described above, and can detect acceleration in one axial direction or acceleration in two axial directions or three axial directions as necessary. The angular velocity sensors 2340x, 2340y, and 2340z are not particularly limited, and for example, a vibration gyro sensor using the Coriolis force can be used.

Further, a control IC 2360 is mounted at a lower surface of the circuit board 2320. The control IC 2360 that performs control based on a detection signal output from the physical quantity sensor 1 as a controller is, for example, a micro controller unit (MCU), includes a storer including a non-volatile memory, an A/D converter, and the like therein, and controls each unit of the inertial measurement unit 2000. In addition, a plurality of electronic components are mounted at the circuit board 2320.

As described above, the inertial measurement unit 2000 according to the embodiment includes the physical quantity sensor 1 and the control IC 2360 that performs the control based on the detection signal output from the physical quantity sensor 1 as the controller. According to the inertial measurement unit 2000, since the acceleration sensor unit 2350 including the physical quantity sensor 1 is used, an effect of the physical quantity sensor 1 can be enjoyed, and the inertial measurement unit 2000 capable of implementing high accuracy and the like can be provided.

The inertial measurement unit 2000 is not limited to the configurations in FIGS. 13 and 14. For example, only the physical quantity sensor 1 may be provided as the inertial sensor without providing the angular velocity sensors 2340x, 2340y, and 2340z in the inertial measurement unit 2000. In this case, for example, the inertial measurement unit 2000 may be implemented by housing the physical quantity sensor 1 and the control IC 2360 that implements the controller in a package that is a housing container.

As described above, a physical quantity sensor according to the embodiment includes an anchor fixed to a substrate, a support beam, a fixed electrode unit, a movable body, and a damper unit. The fixed electrode unit is provided at the substrate. One end of the support beam is coupled to the anchor. The movable body includes a movable electrode unit and a frame unit. The movable electrode unit includes a movable electrode facing a fixed electrode of the fixed electrode unit. The frame unit couples the movable electrode unit and the other end of the support beam. The damper unit is coupled to the frame unit, is provided in a region surrounded by the support beam and the frame unit, and damps vibration of the frame unit in a first direction.

According to the embodiment, miniaturization of the physical quantity sensor can be implemented by housing the damper unit inside the movable body.

In the embodiment, the frame unit includes a first portion having one end coupled to the other end of the support beam and extending with a second direction as a long-side direction, a second portion having one end coupled to the other end of the first portion and extending with the first direction as a long-side direction, and a reinforcer provided at an intersection of the first portion and the second portion.

In this way, the frame unit can perform twisting movement around a rotation axis along the support beam. Since the reinforcer is provided at the intersection of the first portion and the second portion, coupling between the first portion and the second portion can be reinforced. Therefore, a problem of cross-axis sensitivity can be solved by providing the reinforcer while achieving miniaturization of the physical quantity sensor by housing the damper unit inside the movable body. Therefore, the physical quantity sensor which is miniaturized and has high accuracy can be implemented.

In the embodiment, the reinforcer may be a reinforcer configured to fix an intersection angle between the first portion and the second portion.

In this way, rigidity of the frame unit is improved, and the frame unit can be prevented from being deformed when the frame unit receives acceleration in a direction other than a third direction. Therefore, the cross-axis sensitivity of the physical quantity sensor can be prevented and a physical quantity can be detected with the high accuracy.

In the embodiment, the frame unit includes a first portion having one end coupled to the other end of the support beam and extending with the second direction as a long-side direction, and a second portion having one end coupled to the other end of the first portion and extending with the first direction as a long-side direction. The damper unit may be coupled to the first portion in a region surrounded by the support beam and the frame unit.

In this way, the movable body can move in the third direction around the rotation axis along the support beam. When the movable body is displaced in a direction other than the third direction, the damper unit coupled to the first portion of the frame unit can prevent the displacement of the movable body, and can prevent the cross-axis sensitivity of the physical quantity sensor.

In the embodiment, the support beam, the fixed electrode unit, and the movable electrode unit may be arranged in the second direction in an order of the support beam, the fixed electrode unit, and the movable electrode unit, and the damper unit may be provided between the fixed electrode unit and the support beam in the second direction.

In this way, the support beam, the fixed electrode unit, and the damper unit can be disposed compactly in the second direction.

In the embodiment, a frame reinforcer configured to reinforce the frame unit may be provided between the fixed electrode unit and the support beam.

In this way, the fixed electrode unit, the support beam, and the frame reinforcer can be disposed compactly in the second direction, and distortion of a shape of the frame unit can be prevented. Therefore, the physical quantity sensor which is miniaturized and has the high detection accuracy can be implemented.

In the embodiment, the frame unit may include a first portion having one end coupled to the other end of the support beam and extending with the second direction as the long-side direction, a second portion having one end coupled to the other end of the first portion and extending with the first direction as the long-side direction, and a third portion having one end coupled to the other end of the second portion and extending with the second direction as the long-side direction, and the frame reinforcer may be coupled to the first portion and the third portion.

In this way, even when the force in a direction other than the third direction is applied to the movable body, the shape of the frame in a plan view can be maintained constant. Therefore, the cross-axis sensitivity of the physical quantity sensor can be prevented, and the detection accuracy of the physical quantity can be improved.

In addition, the embodiment relates to an inertial measurement unit including a physical quantity sensor and a controller configured to perform control based on a detection signal output from the physical quantity sensor.

Although the embodiment has been described in detail as described above, it can be readily apparent to those skilled in the art that many modifications may be made without departing substantially from novel matters and effects of the present disclosure. Accordingly, such modifications are intended to be included in the scope of the present disclosure. For example, a term cited with a different term having a broader meaning or the same meaning at least once in the specification or the drawings can be replaced with a different term at any place in the specification or the drawings. All combinations of the embodiment and the modifications are also included within the scope of the present disclosure. The configurations, operations, and the like of the physical quantity sensor and the inertial measurement unit are not limited to those described in the embodiment, and various modifications can be made.

What is claimed is:

1. A physical quantity sensor for detecting, when directions orthogonal to one another are defined as a first direction, a second direction, and a third direction, a physical quantity in the third direction, the physical quantity sensor comprising:

an anchor fixed to a substrate;

a support beam having one end coupled to the anchor and extending in the first direction;

a fixed electrode unit provided on the substrate;

a frame unit connected to the other end of the support beam;

a movable electrode unit connected to the frame unit; and a damper unit connected to the frame unit and configured to damp a rotational vibration of the frame unit about the third direction as a rotation axis, wherein the fixed electrode unit includes fixed electrode comb teeth extending in the first direction, the movable electrode unit includes movable electrode comb teeth extending in the first direction and facing the fixed electrode comb teeth, the frame unit includes:

a first portion having one end connected to the other end of the support beam and extending in the second direction; and a second portion having one end connected to the other end of the first portion and extending in the first direction, the damper unit includes a damper anchor and a damper movable unit, wherein the damper movable unit limits a rotational motion of the frame unit about the third direction by colliding with the damper anchor, the damper anchor includes damper fixed comb teeth extending along the second direction and fixed to the substrate, the damper movable unit includes damper movable comb teeth extending along the second direction and facing the damper fixed comb teeth, a thickness along the third direction of each of the damper fixed comb teeth is the same as a thickness along the third direction of each of the damper movable comb teeth, the damper unit is disposed in an area of a side to which the support beam is connected to the first portion of the frame unit when viewed in a plan view from the third direction, the damper anchor is indirectly connected to an outer edge of the first portion of the frame unit on the side to which the support beam is connected, the damper unit is rectangular-shaped and has four sides in the plan view, and the four sides include first, second, and third sides, both ends of the first side are connected to the second and third sides, respectively, an entirety of the first side is directly adjacent to an inner side of the frame unit in the plan view, an entirety of the second side is directly adjacent to the fixed electrode unit in the plan view, and an entirety of the third side is directly adjacent to the support beam in the plan view.

2. The physical quantity sensor according to claim 1, wherein the frame unit further includes a reinforcer provided at an intersection where the first portion and the second portion intersect with each other.

3. The physical quantity sensor according to claim 2, wherein the reinforcer is configured to fix an intersection angle at which the first portion and the second portion intersect with each other.

4. The physical quantity sensor according to claim 1, wherein the support beam, the fixed electrode unit, and the movable electrode unit are arranged along the second direction in an order of the support beam, the fixed electrode unit, and the movable electrode unit, and the damper unit is provided between the fixed electrode unit and the support beam in the second direction.

5. The physical quantity sensor according to claim 4, wherein a frame reinforcer configured to reinforce the frame unit is provided between the fixed electrode unit and the support beam.

6. The physical quantity sensor according to claim 5, wherein the frame unit further includes a third portion having one end side coupled to another end side of the second portion and disposed along the second direction, and the frame reinforcer is coupled to the first portion and the third portion.

7. An inertial measurement unit comprising: the physical quantity sensor according to claim 1; and a controller configured to perform control based on a detection signal output from the physical quantity sensor.

8. The physical quantity sensor according to claim 1, wherein the damper anchor and the damper movable unit have the same thickness in the third direction.

* * * * *